(No Model.)

R. F. OSBORN.
CAR COUPLING.

No. 393,446. Patented Nov. 27, 1888.

ATTEST.
Helen Graham
W. W. Graham

INVENTOR,
RICHARD F. OSBORN,
By L. P. Graham
his attorney.

N. PETERS, Photo-Lithographer, Washington, D. C.

UNITED STATES PATENT OFFICE.

RICHARD F. OSBORN, OF MOWEAQUA, ILLINOIS.

CAR-COUPLING.

SPECIFICATION forming part of Letters Patent No. 393,446, dated November 27, 1888.

Application filed June 19, 1888. Serial No. 277,539. (No model.)

*To all whom it may concern:*

Be it known that I, RICHARD F. OSBORN, of the town of Moweaqua, county of Shelby, and State of Illinois, have invented certain new and useful Improvements in Car-Couplings, of which the following is a specification.

Figure 1:
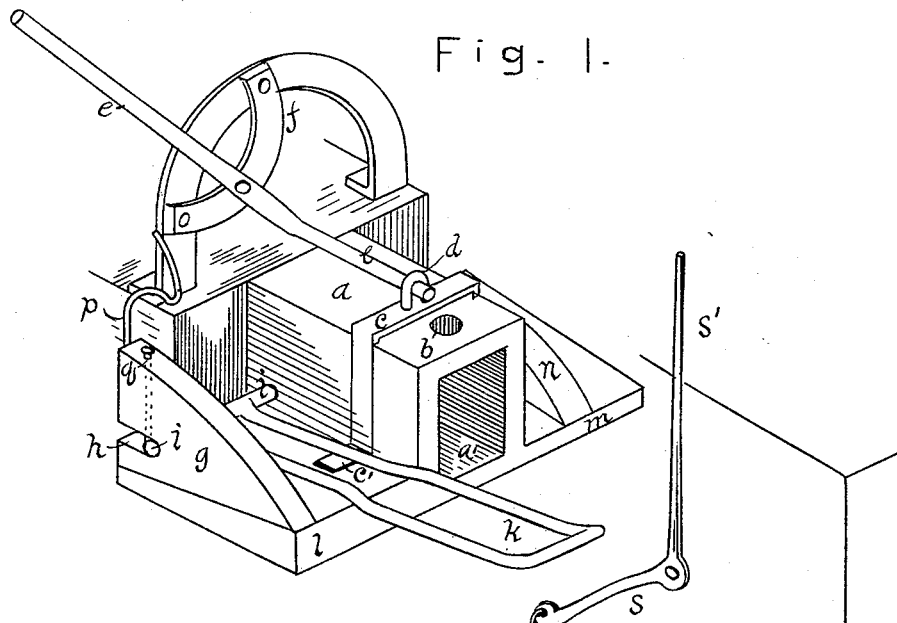
Figure 2:
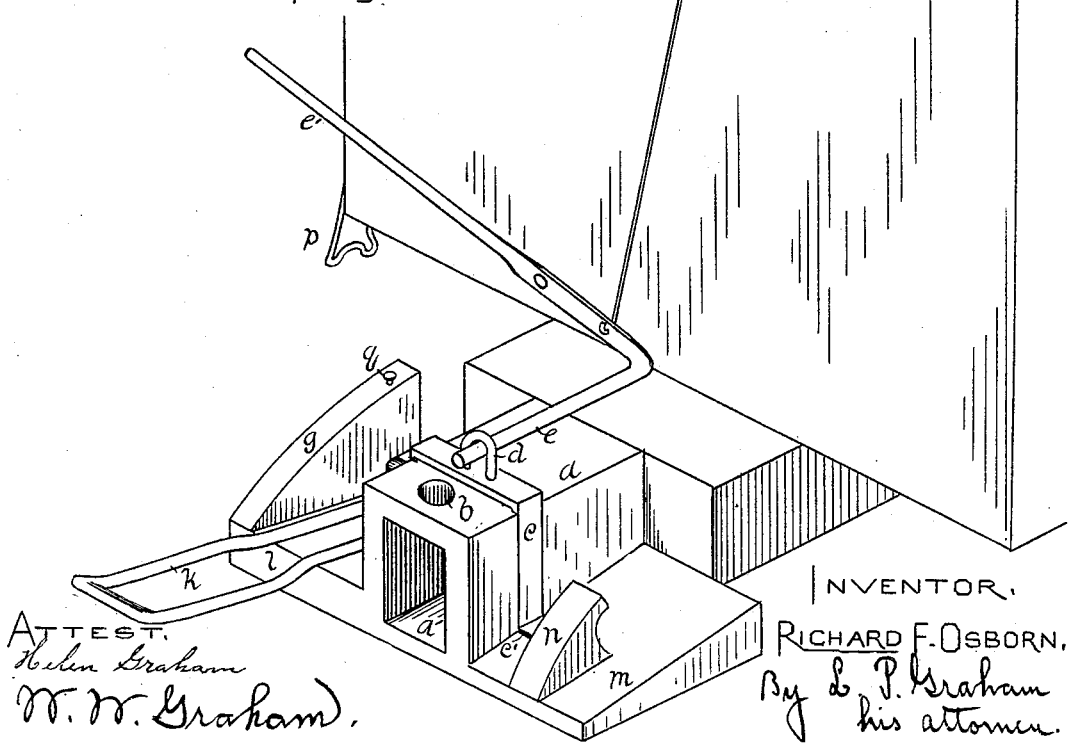

In the drawings accompanying and forming a part of this specification, Figure 1 represents my device as applied to a flat car, and Fig. 2 represents the same adapted to a box-car.

The bumper $a$ has the customary recess, $a'$, for an ordinary link, and also has the hole $b$ for an ordinary pin. On one side of the bumper is platform $l$, inclined downward at its rear end. On the outer edge of platform $l$ is ledge $g$, slotted at $h$ and provided with pin $q$. Pivot-pin $i$ has a bearing in the bumper and in the slot $h$. The pin $q$ retains the pivot-pin in the slot, and when the said pin is withdrawn the pivot and the swinging link $k$, attached thereto, may be readily removed. On the opposite side of the bumper is platform $m$, to the upper surface of which is secured catch $n$. A saddle, $c$, fits vertical grooves in the bumper and has horizontal projections $c'$, adapted to recesses in the platforms. Eye $d$ on the saddle provides a bearing for the lever $e$, and said lever has a handle formation at $e'$. Spring-catches $p$ provide means for securing the levers in positions of extreme depression. The arch $f$ or other suitable frame provides a bearing for the fulcrum of the lever when the device is applied to flat cars. On box-cars levers $s$, having handle formations $s'$, are attached to the tops of the cars and connected with levers $e'$ by rod $r$.

In operation the link of each car passes automatically over the inclined catch of the other car to effect a coupling, and the positions of the links are maintained by force of gravity. Uncoupling is effected by depressing the handle of the lever until the projections $c'$ of the saddle shall have raised the links clear of the catches. By depressing the handle until it is caught by the catch $p$ the links will be rendered entirely inoperative, and the coupling can then be effected with an ordinary link. This enables the coupling to be used in trains made up in part of old-fashioned cars, and is a desirable feature so long as the improved coupling is not used universally.

There will be a lever extending from both sides of the train at each connection, and each lever is capable of raising both links. This, with connections from tops of cars, as shown in Fig. 2, enables uncoupling to be effected from any position of approach.

Should a link be broken or become inoperative in any manner, it may be removed and a good one replaced by the simple expedient of withdrawing pin $q$.

I claim as new and desire to secure by Letters Patent—

A car-coupling comprising the bumper $a'$, the platforms $l$ and $m$, the ledge $g$, having the slot $h$, the pin $q$, traversing the ledge vertically and passing through the slot, the swinging link $k$, having bearings for its pivot-pin $i$ in the bumper and in the slot, the catch $n$, the saddle $c$, adapted to raise links, and the lever $e$, connected with the saddle, as and for the purpose set forth.

In testimony whereof I sign my name in the presence of two subscribing witnesses.

RICHARD F. OSBORN.

Attest:
J. C. HOSTETLER,
L. P. GRAHAM.